US009526017B2

United States Patent
Uchino et al.

(10) Patent No.: US 9,526,017 B2
(45) Date of Patent: Dec. 20, 2016

(54) MOBILE COMMUNICATION SYSTEM, RADIO BASE STATION, AND MOBILE STATION (71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/427,136

(22) PCT Filed: Aug. 19, 2013

(86) PCT No.: PCT/JP2013/072050
§ 371 (c)(1),
(2) Date: Mar. 10, 2015

(87) PCT Pub. No.: WO2014/041962
PCT Pub. Date: Mar. 20, 2014

(65) Prior Publication Data
US 2015/0245228 A1    Aug. 27, 2015

(30) Foreign Application Priority Data

Sep. 13, 2012   (JP) .................................. 2012-201344

(51) Int. Cl.
*H04W 24/04* (2009.01)
*H04W 76/02* (2009.01)
(Continued)

(52) U.S. Cl.
CPC ............... *H04W 24/04* (2013.01); *H04L 5/001* (2013.01); *H04L 5/0098* (2013.01);
(Continued)

(58) Field of Classification Search
None
See application file for complete search history.

(56) References Cited

U.S. PATENT DOCUMENTS

2010/0173626 A1* 7/2010 Catovic ............... H04W 76/027
455/423
2011/0286327 A1* 11/2011 Chen ................... H04W 76/028
370/225

(Continued)

FOREIGN PATENT DOCUMENTS

CN   WO 2012079197 A1 *  6/2012 ........... H04L 5/0037
JP        2011-160121 A       8/2011
(Continued)

OTHER PUBLICATIONS

Office Action issued Apr. 7, 2015 in corresponding Japanese Patent Application No. 2012-201344 (with translation) (8 pages).
(Continued)

Primary Examiner — Ayaz Sheikh
Assistant Examiner — Tarell Hampton
(74) Attorney, Agent, or Firm — Osha Liang LLP (57) ABSTRACT An appropriate action is taken when an abnormality in a layer 2 is detected, even in an "Inter-site CA" operation in which communication for a C-plane signal is performed in a cell #1 under a radio base station eNB#1 via a SRB, and communication for a U-plane signal is performed in a cell #11/#12 under a radio base station eNB#11/#12 via a DRB. In a mobile communication system according to the present invention, the radio base station eNB#11/#12 is configured to provide the radio base station eNB#1 with predetermined notification, when an abnormality is detected in a layer 2 of a downlink to a mobile station UE.

2 Claims, 7 Drawing Sheets (51) Int. Cl.
*H04W 16/32* (2009.01)
*H04L 1/18* (2006.01)
*H04L 5/00* (2006.01)
*H04W 80/02* (2009.01)

(52) U.S. Cl.
CPC ......... *H04W 76/025* (2013.01); *H04W 80/02* (2013.01); *H04L 1/18* (2013.01); *H04W 16/32* (2013.01)

(56) References Cited

U.S. PATENT DOCUMENTS

| | | | | |
|---|---|---|---|---|
| 2012/0099441 | A1* | 4/2012 | Jung | H04L 1/1893 370/242 |
| 2012/0276897 | A1* | 11/2012 | Kwon | H04B 1/1027 455/423 |
| 2012/0281548 | A1* | 11/2012 | Lin | H04W 36/30 370/242 |
| 2013/0316713 | A1* | 11/2013 | Xu | H04W 36/32 455/438 |
| 2013/0329694 | A1* | 12/2013 | Vrzic | H04W 36/165 370/331 |
| 2015/0156764 | A1* | 6/2015 | Yang | H04L 1/0076 370/329 |
| 2015/0365872 | A1* | 12/2015 | Dudda | H04W 36/0055 455/436 |

FOREIGN PATENT DOCUMENTS

| | | |
|---|---|---|
| JP | 2012-138657 A | 7/2012 |
| JP | 2012-165034 A | 8/2012 |
| WO | 2011008002 A2 | 1/2011 |

OTHER PUBLICATIONS

NTT DOCOMO, Inc., "Requirements, Candidate Solutions & Technology Roadmap for LTE Rel-12 Onward," 3GPP Workshop on Release 12 and onwards; RWS-120010; Ljubljana, Slovenia; Jun. 11-12, 2012 (27 pages).

Nokia Siemens Networks et al.; "RLM on SCells," 3GPP TSG-RAN WG2 Meeting #77bis; R2-121181; Jeju, South Korea; Mar. 26-30, 2012 (2 pages).

3GPP TS 36.300 V11.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2012 (201 pages).

International Search Report issued in corresponding application No. PCT/JP2013/072050, mailed Sep. 10, 2013 (5 pages).

Extended European Search Report issued in the counterpart European Patent Application No. 13836266.0, mailed Mar. 22, 2016 (10 pages).

CATT; "SCell RA failure"; 3GPP TSG RAN WG2 Meeting #76, R2-115793; San Francisco, USA; Nov. 14-18, 2011 (2 pages).

* cited by examiner

MOBILE COMMUNICATION SYSTEM, RADIO BASE STATION, AND MOBILE STATION

TECHNICAL FIELD

The present invention relates to a mobile communication system, a radio base station, and a mobile station.

BACKGROUND ART

In LTE (Long Term Evolution) Release-10, CA (Carrier Aggregation) was introduced to realize wide-band communication beyond 20 MHz (for example, communication at 100 Hz). In CA, communication is performed by using bundled CCs (Component Carriers) under a single radio base station eNB as illustrated in FIG. 7(a).

Figure 7:
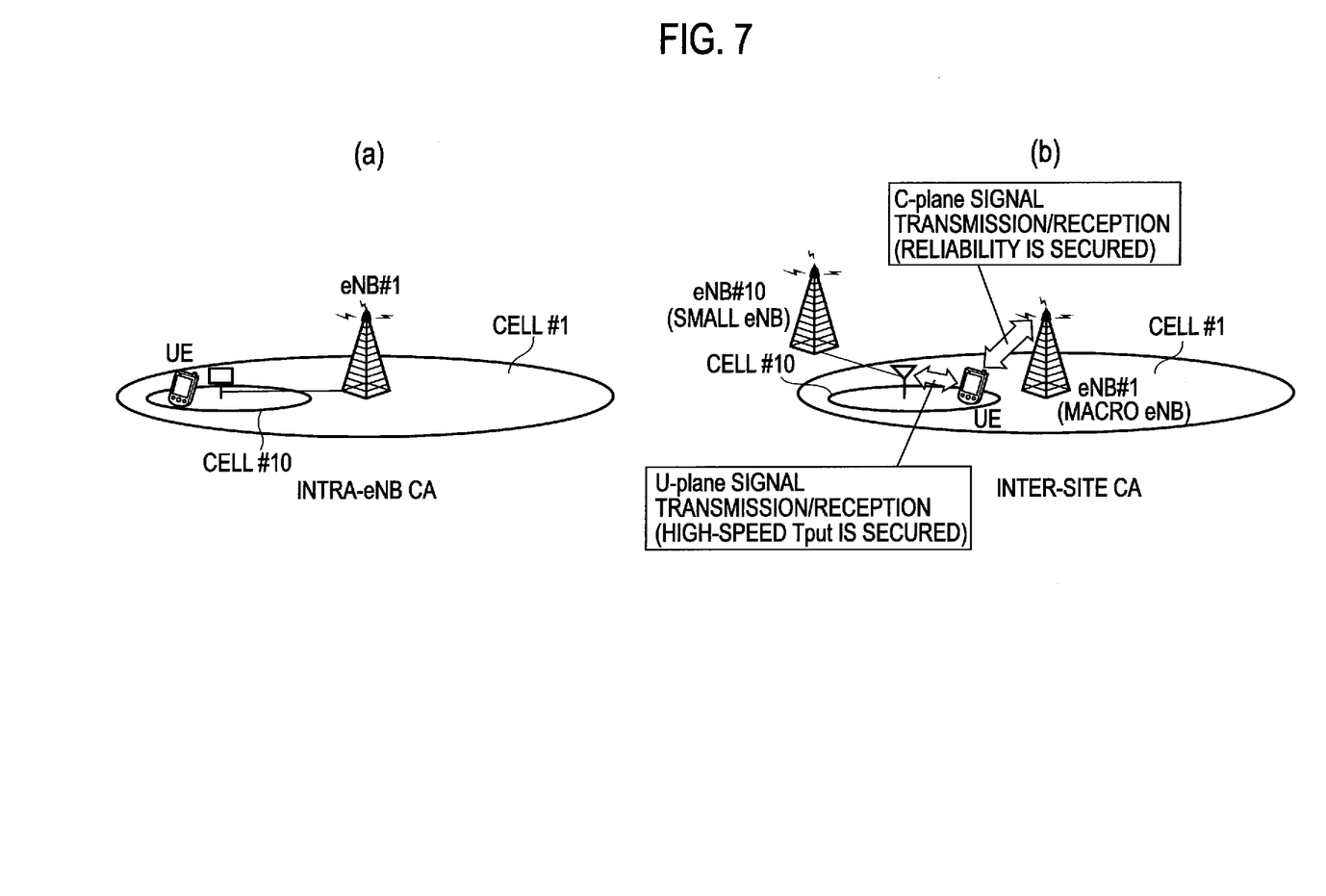
FIG. 7 is a diagram for describing a conventional technique.

Afterwards, in LTE Release-12 and beyond, "Small Cell enhancement" was proposed, and "Inter-site CA" in which communication is performed by using bundled CCs (cells) under different radio base stations eNB has been studied for introduction as a more flexible network architecture than conventional ones (see FIG. 7(b)).

For example, as illustrated in FIG. 7(b), in a conceivable operation using "Inter-site CA" in which communication for a C-plane signal requiring reliability is performed in a cell #1 (a macro cell) under a radio base station eNB#1 (a macro eNB) via a SRB (Signaling Radio Bearer), while communication for a U-plane signal requiring wide-band communication is performed in a cell #10 (a small cell) under a radio base station eNB#10 (a small eNB) via a DRB (Data Radio Bearer).

Figure 8:
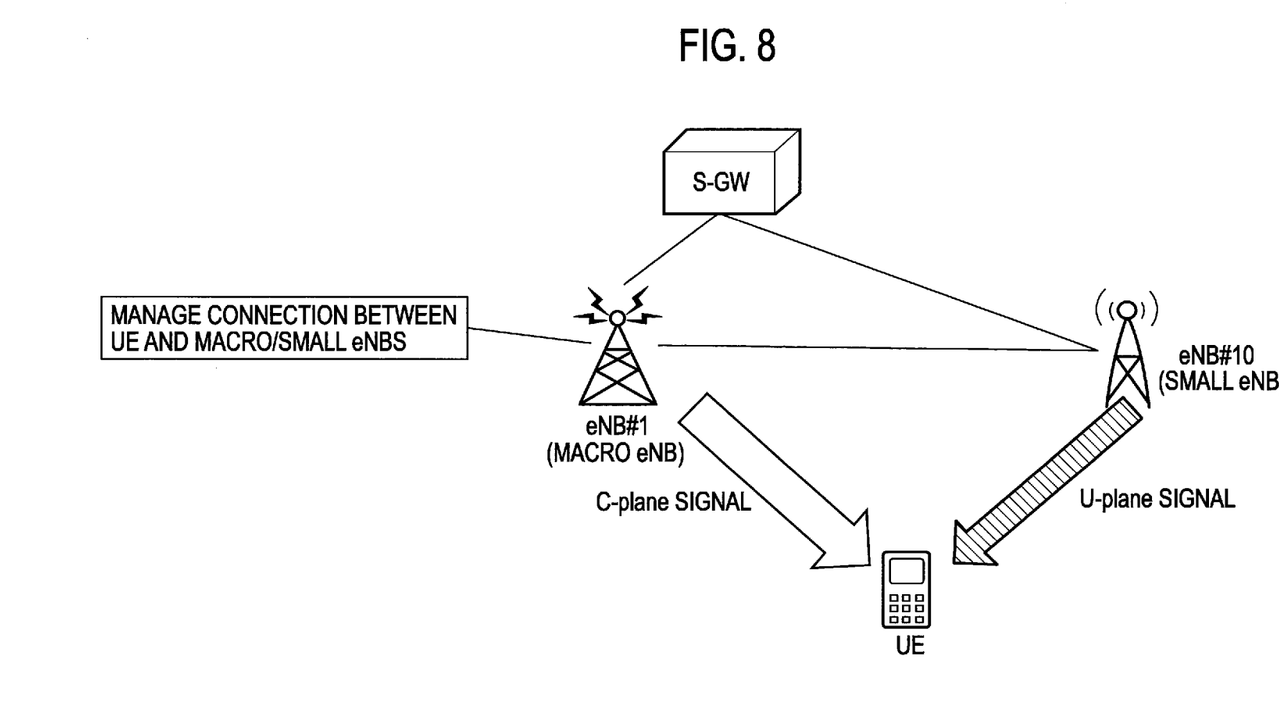
FIG. 8 is a diagram for describing a conventional technique.

In the case where the communication for the C-plane signal is performed in the cell #1 under the radio base station eNB#1 via the SRB, and the communication for the U-plane signal is performed in the cell #10 under the radio base station eNB#10 via the DRB as described above, the radio base station eNB#1 is expected to basically handle connections and settings between a mobile station UE and the radio base station eNB#1/the radio base station eNB#10, as illustrated in FIG. 8.

In this case, basically, it is expected that the cell #1 (the macro cell) is set as a reliable Pcell (Primary Cell), and the cell #10 is set as a supplementary Scell (Secondary Cell).

Here, according to the LTE specifications, a layer 2 is to be reset by notifying an RRC (Radio Resource Control) layer of an abnormality (a state mismatch), when detecting the abnormality.

Conceivable examples of the abnormality detected in the layer 2 are excess of a maximum number of retransmissions in RLC (Radio Link Control) and a failure in an RA (Random Access) procedure (excess of a maximum number of retransmissions of "RA preamble").

Further, the radio base station eNB is configured to reset a layer 2 in a downlink by instructing the mobile station UE to perform "Intra-cell HO", i.e., to perform a handover to the same Pcell (Primary cell).

Here, when the mobile station UE performs "Intra-cell HO", the set Scells all change to a communication-disabled state ("deactive state").

On the other hand, the mobile station UE is configured to reset the layer 2 in an uplink by performing a reconnection procedure.

In this case, the mobile station UE releases the present settings including the Scell and the like, and reestablishes a bearer (connection) for the radio base station eNB.

PRIOR ART DOCUMENT

Non-Patent Document

Non-patent document 1: 3GPP 36.300

SUMMARY OF THE PRESENT INVENTION

As described above, in "Inter-site CA" according to the existing LTE, "Intra-cell HO" is performed and all the Scells enter "deactive state" if an abnormality in the layer 2 is detected at a specific DRB in the downlink; and on the other hand, the reconnection procedure is performed and all the Scells are released if an abnormality in the layer 2 is detected in any of an SRB and a DRB in the uplink.

In "Inter-site CA", however, if communication for a C-plane signal is performed in a cell #1 under a radio base station eNB#1 via a SRB and communication for a U-plane signal is performed in a cell #11/#12 under a radio base station eNB#11/#12 via a DRB, no SRB is established between the radio base station eNB#12 (a small eNB) and the mobile station UE. Therefore, even if an abnormality in the layer 2 is detected at a specific DRB #12 in a downlink, the mobile station UE cannot be instructed to perform an "Intra-cell HO" procedure, which is a problem (see FIG. 9).

Figure 9:
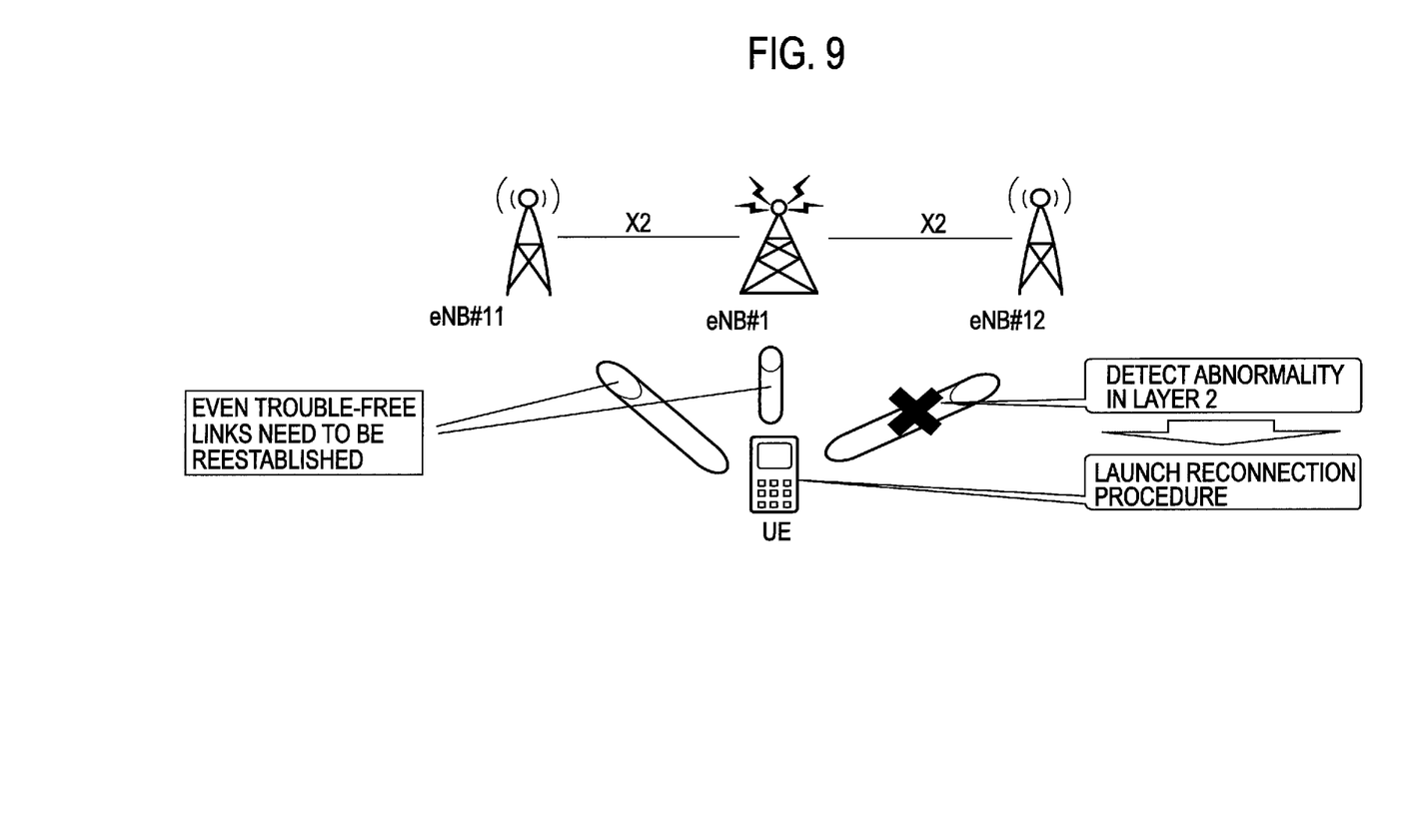
FIG. 9 is a diagram for describing a conventional technique.

Also, in "Inter-site CA", if the communication for the C-plane signal is performed in the cell #1 under the radio base station eNB#1 via the SRB and the communication for the U-plane signal is performed in the cell #11/#12 under the radio base station eNB#11/#12 via the DRB, other DRBs (DRBs #1/#11) where no abnormality in the layer 2 is detected also needs to be reestablished when an abnormality in the layer 2 is detected at a specific DRB #12 in an uplink (see FIG. 9). Therefore, there is a problem that throughput may deteriorate.

Accordingly, the present invention is made in view of the above-described problems, and aims to provide a mobile communication system, a radio base station, and a mobile station, which are capable of taking an appropriate action when an abnormality in a layer 2 is detected, even under an "Inter-site CA" operation in which the communication for the C-plane signal is performed in the cell #1 under the radio base station eNB#1 via the SRB and the communication for the U-plane signal is performed in the cell #10 under the radio base station eNB#10 via the DRB.

A first feature of the present invention is summarized as a mobile communication system in which a mobile station is configured to be capable of performing carrier aggregation via a first cell under a first radio base station and a second cell under a second radio base station. Here, the first radio base station is configured to be capable of transmitting and receiving a control signal and a data signal to and from the mobile station, the second radio base station is configured to be capable of transmitting and receiving a data signal and to be incapable of transmitting and receiving a control signal to and from the mobile station, and the second radio base station is configured to provide the first radio base station with predetermined notification, when an abnormality is detected in a layer 2 of a downlink to the mobile station.

A second feature of the present invention is summarized as a mobile communication system in which a mobile station is configured to be capable of performing carrier aggregation via a first cell under a first radio base station and a second cell under a second radio base station. Here, the first radio base station is configured to be capable of transmitting and receiving a control signal and a data signal to and from the mobile station, the second radio base station is configured to be capable of transmitting and receiving a data signal and to be incapable of transmitting and receiving a control signal to and from the mobile station, and the mobile station is configured to provide the first radio base station with predetermined notification, when an abnormality is detected in a layer 2 of an uplink to the second radio base station.

A third feature of the present invention is summarized as a radio base station capable of serving as a second radio base station in a mobile communication system in which a mobile station is configured to be capable of performing carrier aggregation via a first cell under a first radio base station and a second cell under the second radio base station, the first radio base station is configured to be capable of transmitting and receiving a control signal and a data signal to and from the mobile station, and the second radio base station is configured to be capable of transmitting and receiving a data signal and to be incapable of transmitting and receiving a control signal to and from the mobile station. Here, the radio base station is configured to provide the first radio base station with predetermined notification, when an abnormality is detected in a layer 2 of a downlink to the mobile station.

A fourth feature of the present invention is summarized as a mobile station configured to be capable of performing carrier aggregation via a first cell under a first radio base station and a second cell under a second radio base station. Here, the mobile station is configured to be capable of transmitting and receiving a control signal and a data signal to and from the first radio base station, the mobile station is configured to be capable of transmitting and receiving a data signal and to be incapable of transmitting and receiving a control signal to and from the second radio base station, and the mobile station is configured to provide the first radio base station with predetermined notification, when an abnormality is detected in a layer 2 of an uplink to the second radio base station.

MODE FOR CARRYING OUT THE PRESENT INVENTION

Mobile Communication System According to First Embodiment of Present Invention

A mobile communication system according to a first embodiment of the present invention is described with reference to FIG. 1 to FIG. 6.

Figure 1:
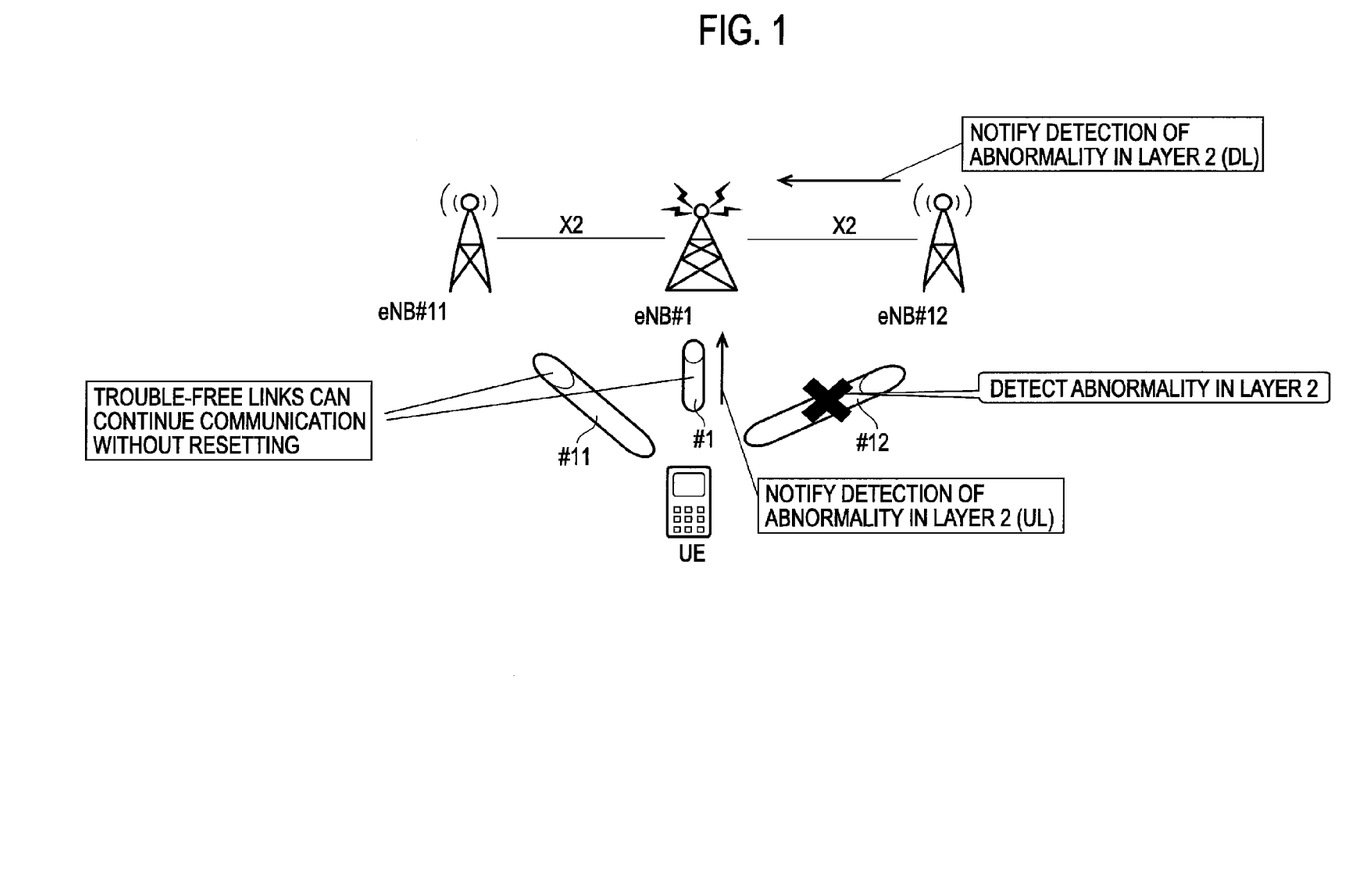
FIG. 1 is an overall configuration diagram of a mobile communication system according to a first embodiment of the present invention.

The mobile communication system according to the present embodiment employs LTE, and is configured as a system to which "Inter-site CA" is applicable, as illustrated in FIG. 1.

In other words, in the mobile communication system according to the present embodiment, a mobile station UE is configured to be capable of performing "Inter-site CA" via a cell #1 under a radio base station eNB#1, and a cell #11/#12 under a radio base station eNB#11/#12.

Further, the mobile communication system according to the present embodiment includes the radio base station eNB#11 (a small eNB) managing the cell #11, the radio base station eNB#12 (a small eNB) managing the cell #12, and the radio base station eNB#1 (a macro eNB) managing the cell #1.

Here, the cell #11/#12 is a small cell (a phantom cell), and the cell #1 is a macro cell. Note that a coverage area of the cell #11/#12 and a coverage area of the cell #1 are arranged to overlap each other at least partially.

The radio base station eNB#1 and the mobile station UE are configured to be capable of transmitting and receiving a C-plane signal to and from each other via a C-plane bearer #1, and transmitting and receiving a U-plane signal via a U-plane bearer #1.

The radio base station eNB#11/#12 and the mobile station UE are configured to be capable of transmitting and receiving the U-plane signal to and from each other via the U-plane bearer #11/#12, and to be incapable of transmitting and receiving the C-plane signal to and from each other.

Figure 2:
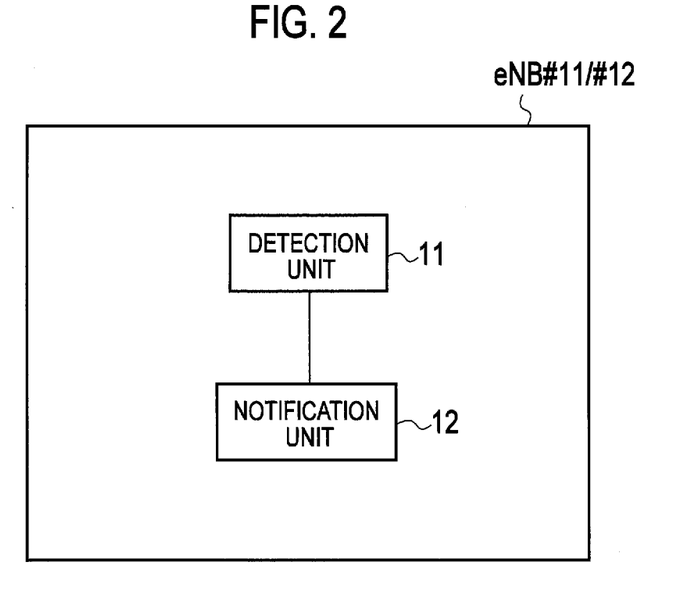
FIG. 2 is a functional block diagram of a radio base station eNB#11/#12 according to the first embodiment of the present invention.

The radio base station eNB#11/#12 according to the present embodiment includes a detection unit 11 and a notification unit 12, as illustrated in FIG. 2.

The detection unit 11 is configured to detect an abnormality (a state mismatch) in a layer 2 of a downlink (the U-plane bearer) to the mobile station UE.

For example, the detection unit 11 is configured to detect the abnormality in the layer 2, when detecting excess of a maximum number of retransmissions in RLC, in the downlink to the mobile station UE.

The notification unit 12 is configured to provide the radio base station eNB#1 with predetermined notification via an arbitrary interface such as X2 and S1, when the abnormality in the layer 2 of the downlink to the mobile station UE is detected by the detection unit 11.

For example, such predetermined notification may be configured to notify "the fact that the abnormality is detected in the layer 2" directly.

Further, such predetermined notification may be configured to notify identification information (such as PCI, CGI, and ScellIndex) of the cell where the abnormality in the layer 2 is detected.

Furthermore, such predetermined notification may be configured to notify identification information of the radio base station eNB to which the cell where the abnormality in the layer 2 is detected belongs.

Alternatively, the notification unit 12 may be configured to transmit an identifier of the U-plane bearer set for the mobile station UE and a request for deleting or resetting this U-plane bearer to the radio base station eNB#1, when the abnormality in the layer 2 of the downlink to the mobile station UE is detected by the detection unit 11.

Such a request may be configured so that the request is transmitted independently of the above-described predetermined notification, or transmitted by the above-described predetermined notification.

Such a request may be configured to notify "the fact that the abnormality is detected in the layer 2" as "Cause". Further, such a request may be configured to notify identification information of the mobile station UE simultaneously.

Note that the notification unit 12 may be configured to provide the small eNB capable of transmitting and receiving the C-plane signal, not the macro eNB, with predetermined notification, when the abnormality in the layer 2 of the downlink to the mobile station UE is detected by the detection unit 11.

Figure 3:
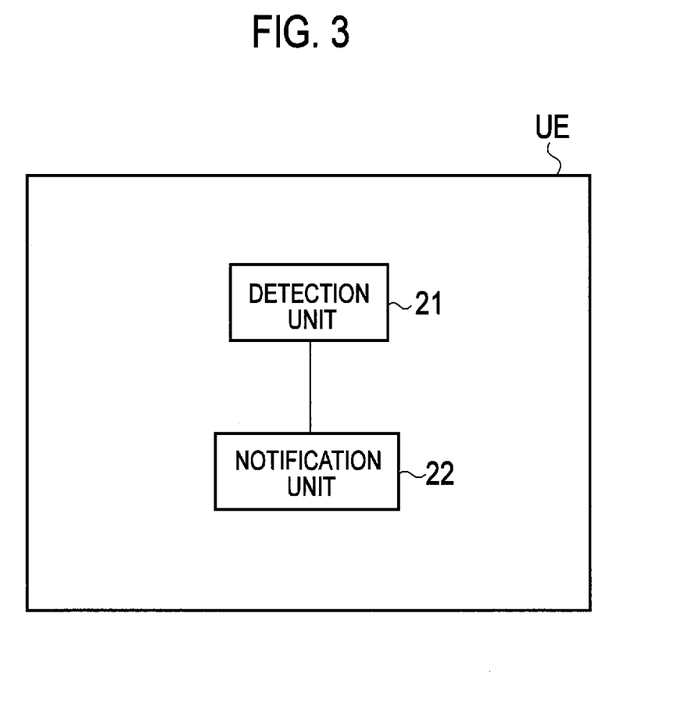
FIG. 3 is a functional block diagram of a mobile station UE according to the first embodiment of the present invention.

The mobile station UE according to the present embodiment includes a detection unit 21 and a notification unit 22 as illustrated in FIG. 3.

The detection unit 21 is configured to detect an abnormality (a state mismatch) in a layer 2 of an uplink (the U-plane bearer) to the radio base station eNB#11/#12.

For example, the detection unit 21 is configured to detect the abnormality in the layer 2, when detecting excess of a maximum number of retransmissions in RLC and a failure in an RA procedure (excess of a maximum number of retransmissions of "RA preamble"), in the uplink to the radio base station eNB#11/#12.

The notification unit 22 is configured to provide the radio base station eNB#1 with predetermined notification, when the abnormality is detected in the layer 2 of the uplink to the radio base station eNB#11/#12 by the detection unit 21.

For example, such predetermined notification may be configured to notify "the fact that the abnormality is detected in the layer 2" directly.

Further, such predetermined notification may be configured to notify identification information (such as PCI, CGI, and ScellIndex) of the cell where the abnormality in the layer 2 is detected.

Furthermore, such predetermined notification may be configured to notify identification information of the radio base station eNB to which the cell where the abnormality in the layer 2 is detected belongs.

Alternatively, the notification unit 22 may be configured to transmit an identifier of the U-plane bearer set for the radio base station eNB#11/#12 and a request for deleting (or resetting) this U-plane bearer, to the radio base station eNB#1, when the abnormality in the layer 2 of the uplink to the radio base station eNB#11/#12 is detected by the detection unit 21.

Such a request may be configured so that the request is transmitted independently of the above-described predetermined notification, or transmitted by the above-described predetermined notification.

Such a request may be configured to notify "the fact that the abnormality is detected in the layer 2" as "Cause". Further, such a request may be configured to notify identification information of the mobile station UE simultaneously.

Note that the notification unit 22 may be configured to provide the small eNB capable of transmitting and receiving the C-plane signal, not the macro eNB, with predetermined notification, when the abnormality in the layer 2 of the uplink to the radio base station eNB#11/#12 is detected by the detection unit 21.

In this case, the cell or radio base station eNB provided with the predetermined notification may be notified beforehand.

Figure 4:
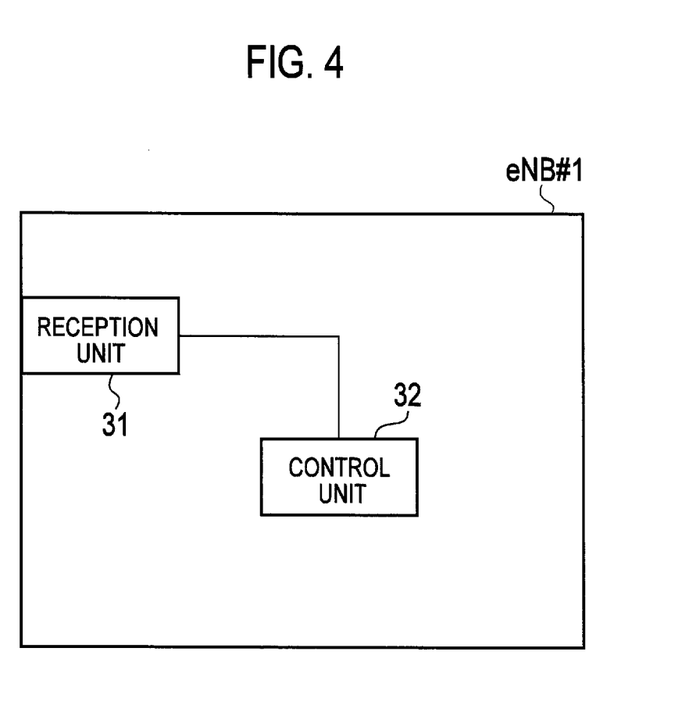
FIG. 4 is a functional block diagram of a radio base station eNB#1 according to the first embodiment of the present invention.

The radio base station eNB#1 according to the present embodiment includes a reception unit 31 and a control unit 32 as illustrated in FIG. 4.

The reception unit 31 is configured to receive various signals from the radio base station eNB#11/#12 and the mobile station UE.

For example, the reception unit 31 is configured to receive the above-described predetermined notification and request from the radio base station eNB#11/#12 and the mobile station UE.

The control unit 32 is configured to perform deletion or resetting of the applicable U-plane bearer, based on the above-described predetermined notification or request.

Here, the control unit 32 may be configured to perform deletion or resetting of the applicable radio base station eNB#11/#12 (the small eNB), simultaneously with the above-described deletion or resetting of the U-plane bearer.

Operation of the mobile communication system according to the present embodiment is described below with reference to FIG. 5 and FIG. 6.

First, operation of the radio base station eNB#11/#12 according to the present embodiment is described with reference to FIG. 5.

Figure 5:
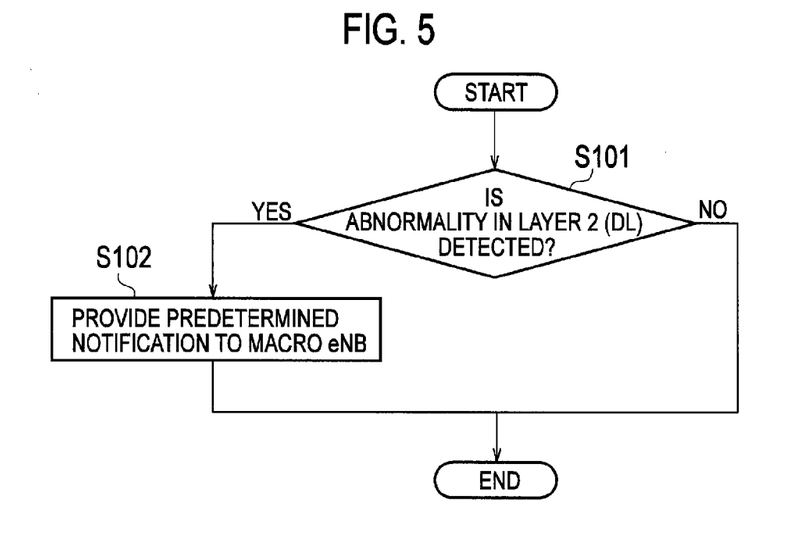
FIG. 5 is a flowchart illustrating operation of the radio base station eNB#11/#12 according to the first embodiment of the present invention.

As illustrated in FIG. 5, the radio base station eNB#11/#12 determines whether there is occurrence of an abnormality (a state mismatch) in the layer 2 of the downlink (the U-plane bearer) to the mobile station UE, in step S101.

If "YES", this operation proceeds to step S102, whereas if "NO", this operation ends.

In step S102, the radio base station eNB#11/#12 provides the radio base station eNB#1 with predetermined notification.

The radio base station eNB#1 performs deletion or resetting of the applicable U-plane bearer, based on this predetermined notification.

Secondly, operation of the mobile station UE according to the present embodiment is described with reference to FIG. 6.

Figure 6:
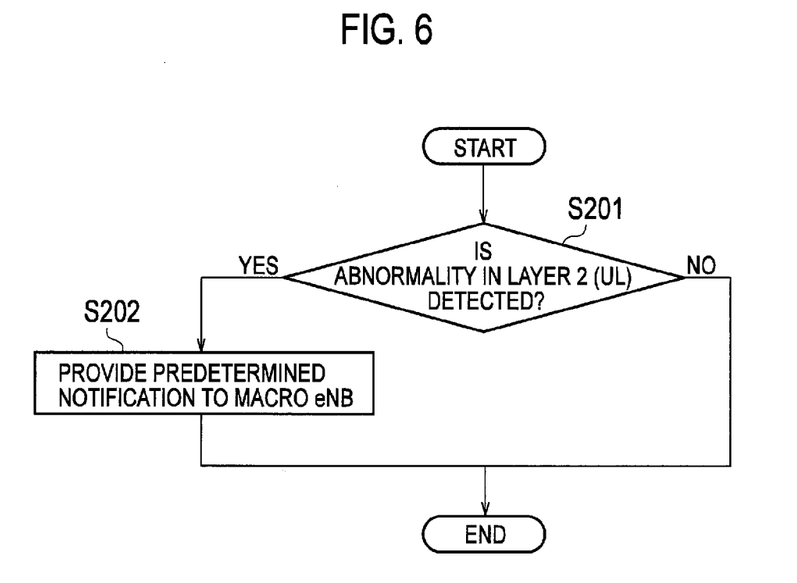
FIG. 6 is a flowchart illustrating operation of the mobile station UE according to the first embodiment of the present invention.

As illustrated in FIG. 6, the mobile station UE determines whether there is occurrence of an abnormality (a state mismatch) in the layer 2 of the uplink (the U-plane bearer) to the radio base station eNB#11/#12, in step S201.

If "YES", this operation proceeds to step S202, whereas if "NO", this operation ends.

In step S202, the mobile station UE provides the radio base station eNB#1 with predetermined notification.

The radio base station eNB#1 performs deletion or resetting of the applicable U-plane bearer, based on this predetermined notification.

According to the mobile communication system of the present embodiment, when detecting an abnormality (a state mismatch) in the layer 2 of the downlink (the U-plane bearer) to the mobile station UE, the radio base station eNB#11/#12 can notify the radio base station eNB#1 of this event. Therefore, the radio base station eNB#1 can take an appropriate action when an abnormality in the layer 2 is detected, even in an "Inter-site CA" operation in which communication for the C-plane signal is performed in the cell #1 under the radio base station eNB#1 via the SRB for the C-plane signal, and communication for the U-plane signal is performed in the cell #11/#12 under the radio base station eNB#11/#12 via the DRB.

Similarly, according to the mobile communication system of the present embodiment, when detecting an abnormality (a state mismatch) in the layer 2 of the uplink (the U-plane bearer) to the radio base station eNB#11/#12, the mobile station UE can notify the radio base station eNB#1 of this detection. Therefore, the radio base station eNB#1 can take an appropriate action when the abnormality in the layer 2 is detected, even in the case of performing the "Inter-site CA" operation in which the communication for the C-plane signal is performed in the cell #1 under the radio base station eNB#1 via the SRB, and the communication for the U-plane signal is performed in the cell #11/#12 under the radio base station eNB#11/#12 via the DRB.

The features of the present embodiment may also be expressed as follows.

A first feature of the present embodiment is summarized as a mobile communication system in which a mobile station UE is configured to be capable of performing "Inter-site CA (carrier aggregation)" via a cell #1 (first cell) under a radio base station eNB#1 (first radio base station) and a cell #11/#12 (second cell) under a radio base station eNB#11/#12 (second radio base station). Here, the radio base station eNB#1 is configured to be capable of transmitting and receiving a C-plane signal (control signal) and a U-plane signal (data signal) to and from the mobile station UE, the radio base station eNB#11/#12 is configured to be capable of transmitting and receiving a U-plane signal and to be incapable of transmitting and receiving a C-plane signal to and from the mobile station UE, and the radio base station eNB#12 is configured to provide the radio base station eNB#1 with predetermined notification, when an abnormality is detected in a layer 2 of a downlink to the mobile station UE.

A second feature of the present embodiment is summarized as a mobile communication system in which a mobile station UE is configured to be capable of performing "Inter-site CA" via a cell #1 under a radio base station eNB#1 and a cell #11/#12 under a radio base station eNB#11/#12. Here, the radio base station eNB#1 is configured to be capable of transmitting and receiving a C-plane signal and a U-plane signal to and from the mobile station UE, the radio base station eNB#11/#12 is configured to be capable of transmitting and receiving a U-plane signal and to be incapable of transmitting and receiving a C-plane signal to and from the mobile station UE, and the mobile station UE is configured to provide the radio base station eNB#1 with predetermined notification, when an abnormality is detected in a layer 2 of an uplink to the radio base station eNB#12.

A third feature of the present embodiment is summarized as a radio base station capable of serving as a radio base station eNB#11/#12 in a mobile communication system in which a mobile station UE is configured to be capable of performing "Inter-site CA" via a cell #1 under a radio base station eNB#1 and a cell #11/#12 under the radio base station eNB#11/#12, the radio base station eNB#1 is configured to be capable of transmitting and receiving a C-plane signal and a U-plane signal to and from the mobile station UE, and the radio base station eNB#11/#12 is configured to be capable of transmitting and receiving a U-plane signal and to be incapable of transmitting and receiving a C-plane signal to and from the mobile station UE. Here, the radio base station eNB is configured to provide the radio base station eNB#1 with predetermined notification, when an abnormality is detected in a layer 2 of a downlink to the mobile station UE.

A fourth feature of the present embodiment is summarized as a mobile station UE configured to be capable of performing "Inter-site CA" via a cell #1 under a radio base station eNB#1 and a cell #11/#12 under a radio base station eNB#11/#12. Here, the mobile station UE is configured to be capable of transmitting and receiving a C-plane signal and a U-plane signal to and from the radio base station eNB#1, the mobile station UE is configured to be capable of transmitting and receiving a U-plane signal and to be incapable of transmitting and receiving a C-plane signal to and from the radio base station eNB#11/#12, and the mobile station UE is configured to provide the radio base station eNB#1 with predetermined notification, when an abnormality is detected in a layer 2 of an uplink to the radio base station eNB#12.

Here, the foregoing operations of the mobile station UE and the radio base stations eNB#1/#10 may be implemented by hardware, may be implemented by a software module executed by a processor, or may be implemented in combination of the two.

Further, in the above-described example, the excess of the maximum number of retransmissions in RLC and the failure (the excess of the maximum number of retransmissions of "RA preamble") in the RA procedure are taken as examples of an event of detecting an abnormality in the layer 2. However, this event may be, for example, excess of a maximum number of retransmissions of HARQ (Hybrid-ARQ) in a MAC (Media Access Control) layer. Alternatively, this event may be the number of PDCP-PDU/SDU cancellation in a PDCP (Packet Data Convergence Protocol) layer, or a failure in ROHC (header compression) decompression processing. Still alternatively, a failure in concealment release processing may be used.

Still alternatively, the event of detecting an abnormality in the layer 2 may be excess of retransmission of a synchronization request signal from the radio base station eNB, or may be a failure in setting of "Inter-site CA" (e.g., a time-out of a timer used in setting).

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base stations eNB#1/#10. Otherwise, the storage medium and the processor may be provided as discrete components inside the mobile station UE and the radio base stations eNB#1/#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-201344 (filed on Sep. 13, 2012) is incorporated by reference in the present specification.

INDUSTRIAL APPLICABILITY

As described above, according to the present invention, it is possible to provide the mobile communication system, the radio base station, and the mobile station, which are capable of taking an appropriate action when an abnormality in the layer 2 is detected, even in an "Inter-site CA" operation in which the communication for the C-plane signal is performed in the cell #1 under the radio base station eNB#1 via the SRB, and the communication for the U-plane signal is performed in the cell #10 under the radio base station eNB#10 via the DRB.

EXPLANATION OF THE REFERENCE NUMERALS eNB#1/#11/#12 radio base station
UE mobile station
11, 12 detection unit
12, 22 notification unit
31 reception unit
32 control unit

The invention claimed is:

1. A mobile communication system in which a mobile station is configured to be capable of performing carrier aggregation via a first cell under a first radio base station and a second cell under a second radio base station, wherein
 the first radio base station is configured to be capable of transmitting and receiving a control signal and a data signal to and from the mobile station,
 the second radio base station is configured to be capable of transmitting and receiving a data signal and to be incapable of transmitting and receiving a control signal to and from the mobile station,
 the mobile station is configured to provide the first radio base station with predetermined notification, when an abnormality is detected in a layer 2 of an uplink to the second radio base station, and
 the abnormality includes an excess of a maximum number of RLC retransmissions.

2. A mobile station configured to be capable of performing carrier aggregation via a first cell under a first radio base station and a second cell under a second radio base station, wherein
 the mobile station is configured to be capable of transmitting and receiving a control signal and a data signal to and from the first radio base station,
 the mobile station is configured to be capable of transmitting and receiving a data signal and to be incapable of transmitting and receiving a control signal to and from the second radio base station,
 the mobile station is configured to provide the first radio base station with predetermined notification, when an abnormality is detected in a layer 2 of an uplink to the second radio base station, and
 the abnormality includes an excess of a maximum number if RLC retransmissions.

* * * * *